May 7, 1968 S. F. LYBARGER ET AL 3,382,321
TRANSISTORIZED AMPLIFIER CIRCUIT FOR HEARING AIDS
Filed July 9, 1964
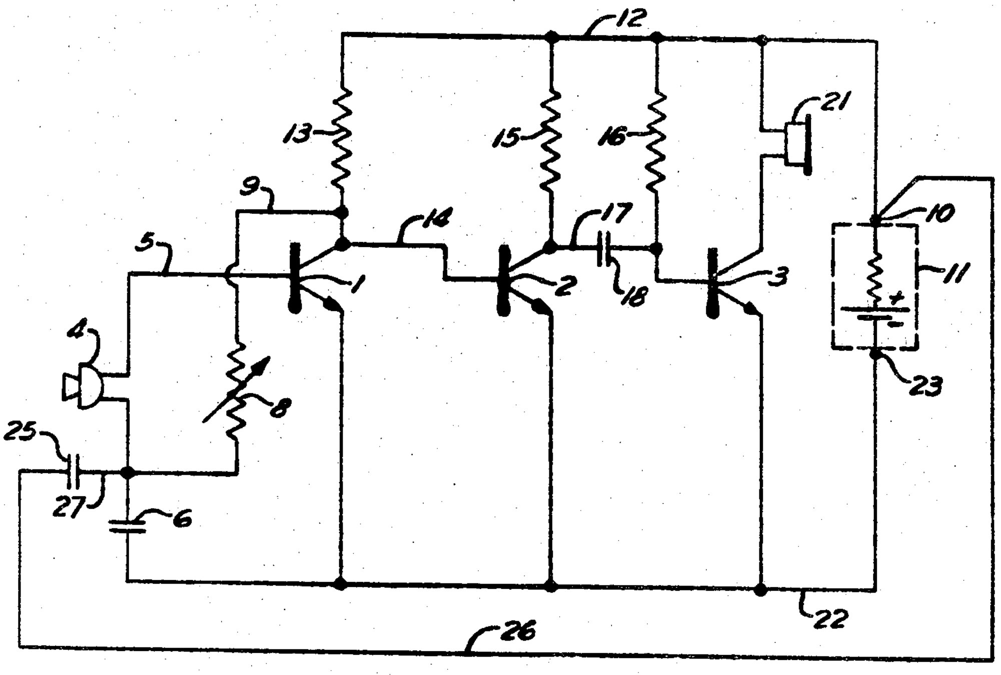
INVENTORS.
SAMUEL F. LYBARGER
FRED E. BARRON
WILLIAM A. STEELE
BY Brown, Critchlow, Flick & Peckham.
ATTORNEYS.

United States Patent Office 3,382,321

Patented May 7, 1968

3,382,321
TRANSISTORIZED AMPLIFIER CIRCUIT FOR HEARING AIDS

Samuel F. Lybarger, Peters Township, Washington County, Fred E. Barron, Baldwin Township, Allegheny County, and William A. Steele, Bethel Park, Pa., assignors, by mesne assignments, to Radioear Corporation, Canonsburg, Pa., a corporation of Pennsylvania Filed July 9, 1964, Ser. No. 381,345
7 Claims. (Cl. 179—1)

ABSTRACT OF THE DISCLOSURE

In a hearing aid amplifier, low frequency oscillations known as "motorboating" are neutralized by a negative feedback loop so connected that when the D-C source voltage drops due to internal impedance, a corresponding voltage of reverse phase is fed back from the battery terminal to balance the oscillatory tendency.

This invention relates to small transistor amplifiers used for hearing aids and similar purposes, where, because of the small space available, it is important to use as few components as possible and also to use small batteries, the internal impedance of which is not negligible.

One object of the invention is to provide such an amplifier circuit, in which internal impedance of the battery is prevented from causing oscillation in the hearing aid.

Another object is to reduce the size and number of components required to produce such a circuit which is stable with respect to internal battery impedance.

The preferred embodiment of the invention is illustrated in the accompanying drawing of an electric circuit diagram.

Referring to the drawing, a three-stage transistor amplifier circuit is shown, although the invention is also applicable to a circuit containing more than three transistors. These transistors 1, 2 and 3 form successive stages of amplification. A source of alternating current to be amplified, such as a microphone 4, supplies the input voltage for the first stage. Thus, one terminal of the microphone is electrically connected by conductor 5 to the base of the first transistor 1. The other terminal of the microphone is connected with the emitter of the same transistor through a first stage coupling condenser 6 and, if desired, through a resistor (not shown). This condenser is necessary in order to permit the base of the transistor to have the proper direct current bias.

The bias current is supplied through a resistor 8, which may be variable so that the bias current can be adjusted to control the gain of the first and second stages and hence of the amplifier. In such a case, the effect of the changes in the variable bias resistor or rheostat ordinarily is much greater on the gain of the second stage than on that of the first. The value of this bias resistor, when variable, that produces the greatest gain in the second stage is the value for which oscillation is most likely to occur. One end of the resistor is electrically connected with the base of the first transistor, preferably through the microphone by connecting one end of the resistor to a point between the microphone and the coupling condenser, although the resistor may be connected directly to the base of transistor 1 if desired. The other end of the resistor is connected by a conductor 9 with means electrically connecting one terminal 10 of a battery 11 with the collectors of all of the transistors. This connecting means may include a conductor 12 and three resistors. Thus, current is supplied through a coupling resistor 13 to the collector of the first transistor and the base of the second transistor connected therewith by a conductor 14. Another coupling resistor 15 supplies current to the collector of the second transistor. A bias resistor 16 connects conductor 12 with the base of the third transistor. Alternating signal current is carried to the base of the third transistor through a conductor 17 and a condenser 18 that isolates the base from direct current bias except through resistor 16, which can be adjusted to provide the exact bias desired for the output stage.

Electrically connected between the battery and the transistor in the last stage of the circuit is a conductive load device, such as a receiver 21. Preferably, the receiver loads the collector of the third transistor and conducts the direct current needed from terminal 10 of the battery. The emitters of all three transistors are connected to a common ground or wire 22 connected to the other terminal 23 of the battery.

It is to be understood, of course, that other circuit modifications, such as tone controls etc., may be present in addition to those shown in the drawing.

The battery is shown with an internal resistance symbol, which does not represent a separate resistor but merely the internal resistance or impedance of the small battery. Although the internal impedance of a battery is not strictly resistance alone, the equivalent series resistance is the dominant part of the battery impedance at low frequencies and is the property that determines whether or not oscillation, often called "motorboating" because of the "putt-putt" sound it makes, will occur in this type of audio amplifier. Stability problems at low frequencies arise because there is an alternating current voltage drop across the battery impedance, caused primarily by the flow of the AC output signal current through the battery. This undesired voltage drop is transmitted back to earlier stages in the circuit, primarily through coupling resistors 13 and 15. In stages where the phase of the signal that is fed back is opposite to the phase of the input signal to that stage that would produce the specified phase of output signal, negative feedback results. This causes a loss of gain but seldom any further problem in typical audio circuits. In stages where the phase of the signal fed back adds to the input signal, positive feedback results, with possible oscillation. Even with a relatively small internal battery impedance, for example 4 or 5 ohms, objectionable oscillation may be produced.

In the illustrative circuit shown, a voltage drop across the battery 11 would be fed back to the collector of transistor 2, and hence to the base of transistor 3 through condenser 18, in a phase that will cause only a small amount of negative feedback, because of the relatively small amount of loop gain involved. Voltage fed back through coupling resistor 13 and conductor 14 to the base of transistor 2 is in a phase that results in positive feedback. Heretofore, in an attempt to avoid the resulting undesirable oscillation, it has been common practice to install a decoupling circuit or circuits to prevent signal voltages, which result from the output stage current flowing through the battery impedance, from reaching an electrode near the input of the amplifier in a phase that will cause more than a small amount of positive or negative feedback. Such a circuit has included a decoupling resistor in conductor 12 between coupling resistors 13 and 15, and a grounded condenser connected to a point between the decoupling resistor and the resistor 13. With such decoupling elements added, if they are made sufficiently large the amount of positive feedback voltage arriving at the base of transistor 2 can be reduced sufficiently to permit reasonably satisfactory operation for the values of internal battery impedance normally encountered. However, as the battery impedance rises, and particularly with the size of decoupling capacitor practical in very small amplifiers, a point nearly always is reached where the feedback voltage will produce "motor-boating" or oscillation.

It is a feature of this invention that the decoupling resistor and condenser of the earlier decoupling circuits can be eliminated and a single condenser substituted for them, which has a capacity that is only a small fraction of that required for the earlier decoupling condenser with much more satisfactory results than heretofore. Accordingly, a neutralizing or stabilizing condenser 25 is connected in series between terminal 10 of the battery and a point between coupling condenser 6 and the microphone by means of conductors 26 and 27. The value of the stabilizing capacitor is such that it substantially balances the net positive feedback in the circuit resulting from the internal impedance of the battery. In other words, the new condenser 25, in combination with the coupling condenser, forms an alternating current voltage dividing network that feeds back in a reverse phase a fixed proportion of the AC voltage drop across the battery impedance. This reverse voltage is amplified by the first transistor 1 and may be adjusted by the choice of capacitance of the stabilizing condenser to produce just enough negative feedback to neutralize or balance the positive feedback returning through the bias resistor 13, and both positive and negative feedback from other paths in the circuit. Or, the voltage dividing network can be adjusted to provide as negative feedback any desired percentage of the disturbing voltage appearing across the battery.

By correctly adjusting the size of stabilizing condenser 25, the effect of battery resistance on gain can be essentially eliminated. However, with such an adjustment, it may be found that oscillation can occur at some higher value of internal battery resistance, usually out of the range normally encountered. If the stabilizing condenser is made slightly larger in capacitance, thereby increasing the amount of negative feedback, the gain will decrease slightly as the internal battery resistance goes up, but the circuit will become almost completely free of the possibility of oscillation resulting from increased battery resistance.

In most instances, the capacitance of stabilizing condenser 25 will be less than that of coupling condenser 6, generally being only from 1/5 to 1/30 as much. In one such circuit now being used, the capacitance of the stabilizing condenser is only about 1/20 of that of the coupling condenser in order to substantially balance the net positive feedback in the circuit resulting from internal impedance of the battery. For a three-transistor amplifier circuit, such as that shown in the drawing, in which the value of the coupling condenser is three microfarads, a typical value for the stabilizing condenser can be from 0.15 to 0.3 microfarad. The best size for the stabilizing condenser is easily determined experimentally by adding series resistance in the battery circuit and noting the effect on the overall amplifier gain as well as noting whether "motorboating" or oscillation occurs at a sufficiency low value of internal battery resistance to be a problem.

Compared to the earlier decoupling circuits referred to herein, the stabilizing condenser of this invention remains effective for much wider ranges of internal battery resistance and does so with the elimination of one component and a large reduction in capacitance of the other. If the internal impedance of the battery rises as the battery approaches the end of its useful life, or if a batch of batteries of a given type happen to have larger than average internal impedances, the stabilizing negative feedback voltage through the new stabilizing condenser will rise in exactly the same proportion as the positive feedback voltage through coupling resistor 13 and other paths, which otherwise might cause oscillation.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. In a transistorized amplifier circuit for hearing aids, comprising at least three transistors forming successive stages of amplification, each of said stages having an input, a battery common to all of said stages, means electrically connecting one terminal of the battery with the collectors of all of the transistors, means electrically connecting the other terminal of the battery with the emittters of all of the transistors, a source of alternating current to be amplified which supplies the input voltage for the first of said stages, a conductive load device electrically connected between the battery and the transistor in the last stage, a coupling condenser in the first stage connected in series between the emitter of the first transistor and said source of alternating current, and bias resistance means electrically connected with said first-mentioned connecting means and the base of the transistor in said first stage, a stabilizing condenser connected in series between said one terminal of the battery and a point between said coupling condenser and said source of alternating current, the value of the stabilizing condenser being such that it substantially balances the net positive feedback in the circuit resulting from internal impedance of the battery.

2. In a transistorized amplifier circuit according to claim 1, in which said bias resistance is connected with said base through said source of alternating current.

3. In a transistorized amplifier circuit according to claim 1, in which the capacitance of the stabilizing condenser is less than that of the coupling condenser.

4. In a transistorized amplifier circuit according to claim 1, in which the capacitance of the stabilizing condenser is between about one-fifth and one-thirtieth the capacitance of the coupling condenser.

5. In a transistorized amplifier circuit according to claim 1, in which the capacitance of the stabilizing condenser is about one-twentieth the capacitance of the coupling condenser.

6. A transistorized amplifier circuit for hearing aids, comprising at least three transistors forming successive stages of amplification, each of said stages having an input, a battery common to all of said stages, means electrically connecting one terminal of the battery with the collectors of all of the transistors, means electrically connecting the other terminal of the battery with the emitters of all of the transistors, a source of alternating current to be amplified which supplies the input voltage for the first of said stages, a conductive load device electrically connected with the battery and the transistor in the last stage, a coupling condenser in the first stage connected with the emitter of the first transistor, bias resistance means electrically connected with said first-mentioned connecting means and the base of the transistor in said first stage, and a stabilizing condenser connected with said one terminal of the battery, both of said condensers also being connected to a point between said coupling condenser and said source of alternating current to form a voltage dividing network to provide as negative feedback any desired percentage of disturbing voltage appearing across the battery.

7. In a transistorized amplifier circuit for hearing aids, comprising at least three transistors forming successive stages of amplification, a battery common to all of said stages, means electrically connecting one terminal of the battery with the collectors of all of the transistors, means electrically connecting the other terminal of the battery with the emitters of all of the transistors, a microphone having a terminal connected with the base of the transistor in the first stage, a receiver in the circuit between said one terminal of the battery and the collector of the transistor in the last stage, a coupling condenser in the first stage connected in series between the emitter of the first transistor and the other terminal of the microphone, and a variable bias resistor electrically connected with the collector of the first transistor and said other terminal of the microphone, a stabilizing condenser connected in series between said one terminal of the battery and said other terminal of the microphone, the value of the stabilizing condenser being such that it substantially balances the net positive feedback in the circuit resulting from internal impedance of the battery for the value of said variable bias resistor at which oscillation is most likely to occur.

References Cited

UNITED STATES PATENTS

| | | | |
|---|---|---|---|
| 2,568,797 | 9/1951 | Eland | 179—1 |
| 3,194,897 | 7/1965 | Lewis | 179—107 |
| 3,209,083 | 9/1965 | Posen | 179—107 |

KATHLEEN H. CLAFFY, *Primary Examiner.*

R. P. TAYLOR, *Assistant Examiner.*